United States Patent [19]

Harkrader et al.

[11] Patent Number: 5,421,565
[45] Date of Patent: Jun. 6, 1995

[54] SUSPENSION SPRING INSULATOR

[75] Inventors: Ronald L. Harkrader, Whitelake; Nickolas J. Ristich, Waterford; Wayne B. Nelson, Clarkston, all of Mich.

[73] Assignee: General Motors Corporation, Detroit, Mich.

[21] Appl. No.: 288,853

[22] Filed: Aug. 11, 1994

[51] Int. Cl.⁶ .............................. F16F 3/10; F16F 9/54
[52] U.S. Cl. ..................................... 267/220; 267/153; 280/668
[58] Field of Search .................... 267/33, 35, 139, 153, 267/219, 220, 141, 141.2, 141.3, 634; 280/668, 673, 688, 690; 248/636, 638

[56] References Cited

U.S. PATENT DOCUMENTS

| | | | |
|---|---|---|---|
| 3,051,469 | 8/1962 | Boschi | 267/33 |
| 3,263,983 | 8/1966 | Bliven | 267/220 |
| 3,781,033 | 12/1975 | Buchwald | 280/124 R |
| 4,462,608 | 7/1984 | Lederman | 280/668 |
| 4,521,005 | 6/1985 | Calderoni | 267/179 |
| 4,810,003 | 3/1989 | Pinch et al. | 267/33 |
| 5,248,134 | 9/1993 | Ferguson et al. | 267/220 |
| 5,263,694 | 11/1993 | Smith et al. | 267/220 |
| 5,275,389 | 1/1994 | Pinch et al. | 267/220 |
| 5,299,786 | 4/1994 | Godin | 267/33 |
| 5,308,104 | 5/1994 | Charles | 280/668 |

Primary Examiner—Robert A. Oberleitner
Assistant Examiner—Chris Schwartz
Attorney, Agent, or Firm—Jeffrey A. Sedlar

[57] ABSTRACT

A suspension's coil spring insulator provides increased surface area insulation at the top and bottom end coil to vehicle spring seat mating points. Preassembly retention capability and radial location features are provided on the insulator.

5 Claims, 2 Drawing Sheets

SUSPENSION SPRING INSULATOR

BACKGROUND OF THE INVENTION

This invention relates to vehicle suspension systems, and more particularly to suspension systems which include coil springs.

A conventional type of vehicle suspension includes coils springs to aid in dampening the transmission of road inputs to the vehicle. Each coil spring is generally carried between spring seats of the vehicle's frame or body and the vehicle's control arm or axle.

The points of interface between vehicle suspension system components experience a great frequency of movement and are points at which work occurs during all types of vehicle operating conditions. A suspension experiences duty cycles comprised of jounces and rebounds in response to inputs from the surface the vehicle's tires interface with. Therefore, the suspension's performance has a direct impact on what the owner feels and hears from the vehicle and contributes significantly to the vehicle's "ride" characteristics.

A vehicle owner generally uses the vehicle in a variety of conditions and often becomes attuned to sounds and feels generated by the vehicle. This factor contributes to the ride characteristics perceived by the driver and passengers. It is desirable that a vehicle project an image of value and reliability. Therefore, attention is given to the areas such as the interface between the suspension coil springs and the vehicle spring seats with the goal of providing firm, secure and quiet performance of the vehicle's suspension system.

Objectionable sounds or noise can be generated by a vehicle's suspension due to metal-to-metal contact between system components caused by inadequate or nonexistent means of insulation. This has been found to be the case when coil springs are used in a vehicle's suspension. The end coils of a coil spring contact metal vehicle spring seats. During vehicle operation, relative movement occurs between the spring and the mating vehicle surfaces typically causing objectionable sound generation. It is conventional to use resilient insulators between the suspension's coil springs and its points of contact with the vehicle. However, it has been found that suspension systems which utilize coil springs with conventional insulators can exhibit a tendency to generate objectionable sounds.

It has been determined that conventional coil spring systems used in vehicle suspensions result in objectionable noise due to two root causes. First, a sufficient insulation contact area between the end coils and the spring seats may not be provided under all conditions of component part build variations. Second, the spring and mating vehicle components interact actively during suspension duty cycles which can cause known art insulators to become repositioned or torn. It has also been found that with conventional insulators corrosion may be facilitated by trapped water and corrosives, thereby contributing to objectionable noise generation.

SUMMARY OF THE INVENTION

The present invention includes an insulator for positioning on a vehicle suspension's coil spring between either or both of the vehicle's spring seats. The insulator's design can be implemented in a variety of elastic moldable materials to produce the novel, physical configuration.

The insulator consists of an inner annular sleeve with a base connected to an annular seat portion at its inner diameter. At its outer periphery the annular seat portion extends to an annular flange which terminates at an outer lip. Ribs are preferably molded on the outer surface of the inner annular sleeve such that they exert a bias radially outward against the spring when the insulator is applied to the spring. An interference fit results between the insulator and the spring providing a means of retaining the insulator on the spring. Radially inwardly extending tabs on the insulator's outer lip provide a further means of retaining the insulator on the spring.

The inner diameter of the insulator's outer lip is preferably larger than the normal outer diameter of the spring's end coil. This condition is desirable because the spring's coils expand radially outward from the normal diameter when the spring is compressed during the suspension system assembly process. Therefore, the insulator's annular flange insulates the spring coils from metal-to-metal contact with the vehicle's spring seats but is not in complete contact with the coil during the full duty cycle of suspension travel when the spring extends beyond its compressed state.

The insulator preferably includes a stop-locator that provides radial location of the insulator on the spring assembly such that positive radial location is achieved. The insulator also preferably includes a plurality of holes positioned through the annular seat portion to permit fluid to drain away from the insulator and springs.

An advantage of the invention is that the inner annular sleeve and annular flange portions of the insulator are of a size providing greater surface area contact between the spring's coils and the annular channel-shaped mating surfaces of the vehicle's spring seats. The insulator functions such that when the spring coils are forced out of the column during the duty cycle of the suspension system, the spring seat area is insulated by the annular seat portion's inner diameter and outer periphery which extend into the inner annular sleeve and annular flange, respectively. The inner diameter and outer periphery of the annular seat portion and the material thickness thereof combine to insure increased insulating area and operate to avoid metal-to-metal contact between the spring and the mating vehicle surfaces.

The inner annular sleeve of the insulator insures a tight contact between the inner diameter of the spring's coils and the insulator, resulting in positive location of the insulator regardless of surface variations in the mating frame and control arm. The inner annular sleeve and ribs positioned on the outer surface thereof, provide a means of retention permitting subassembly of the insulator to the spring which improves assembly efficiency.

A feature of the present invention is that in the normal free non-assembled state the inner annular sleeve's outer diameter is larger than the inner diameter of the coil spring so that when pressed onto the spring's end coil the insulator exhibits sufficient radial grip to stay on the spring during shipping and handling. To ensure engagement between the insulator and the spring a plurality of tabs are preferably molded into the outer lip of the insulator providing a means for clipping the insulator onto the spring.

It is preferable that the spring be positioned such that the tip of the spring's end coil is located in the spring seat at an outboard-most position of the vehicle. Identification of the root cause of objectionable noise produced by suspensions has found that variance occurred during assembling and compressing the spring into the suspension. During the jounce portion of the suspension's duty cycle, the suspension's spring is typically driven out-of column in a line of action that is predictable to be in the outboard plane. Radial location of the coil spring's end coil tip is important to obtain consistent vehicle alignment and suspension settings. Therefore, the stop-locator is provided which functions to reduce assembly variance by virtue of identifying the end position of the suspension spring coil so that it is properly positioned during assembly.

Providing a means of locating the spring's end coil tip in the outboard plane enhances the probability that the spring will not be repositioned in the assembly. Therefore, reduced repositioning of the insulator spring assembly reduces the possibility that the insulator could become mispositioned which can lead to system noise generation.

Another advantage of the invention is that a plurality of through holes in the annular seat portion of the insulator ensures that fluids drain out from between the spring's coils and the insulator. Drainage reduces the corrosiveness of the environment to which the spring is subjected which aids in eliminating objectionable noise from the vehicle's suspension.

DETAILED DESCRIPTION OF THE PRESENTLY PREFERRED EMBODIMENT

Figure 1:
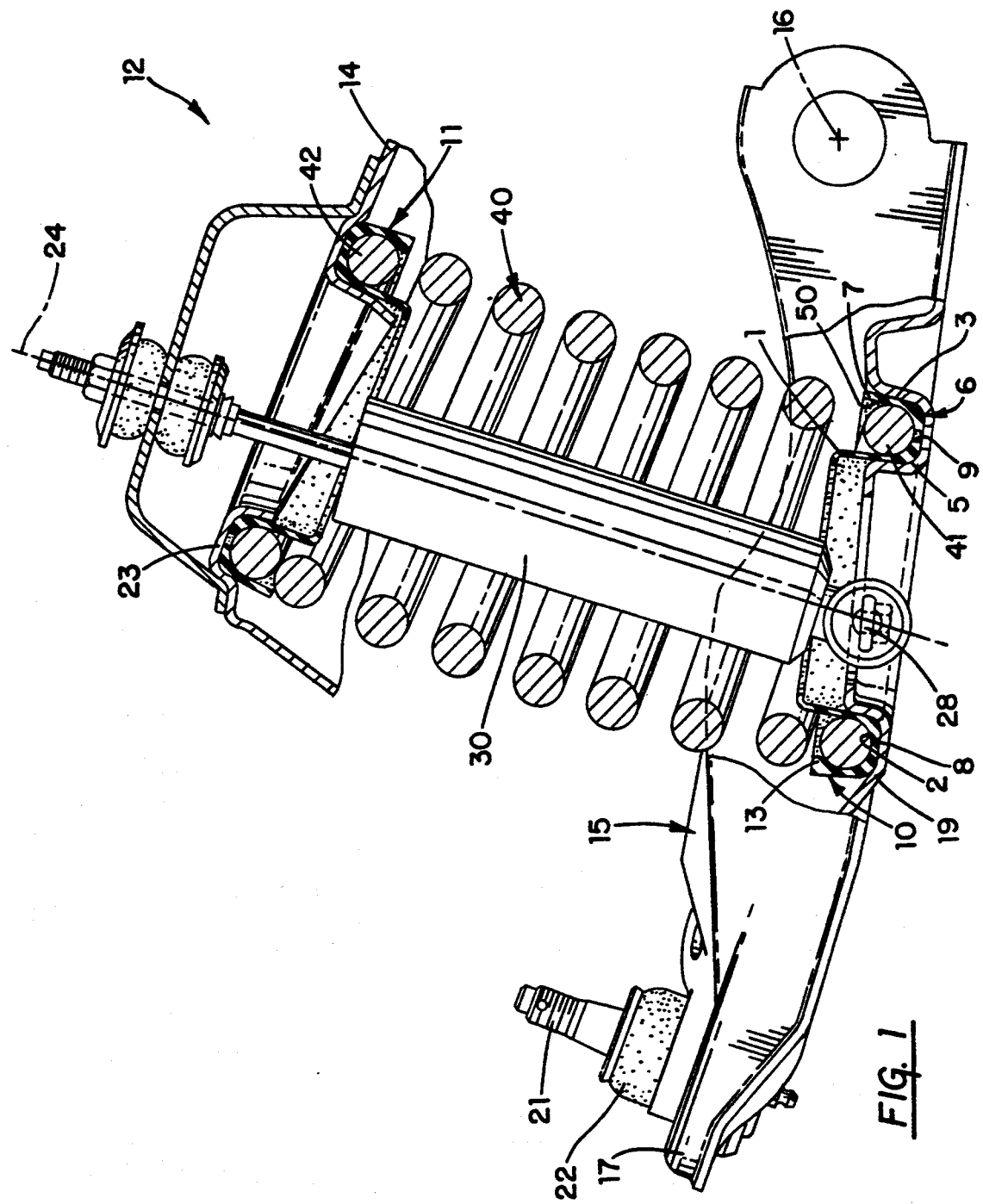
FIG. 1 is a partial assembly view of a vehicle's front suspension system.

Referring to FIG. 1, illustrated is a vehicle's front suspension assembly designated generally as 12. Although the invention is described within the context of a front suspension embodiment it is not so limited but is applicable whenever a coil spring is utilized in a vehicle's suspension. The supporting structure of the vehicle frame 14, which extends beyond the portion illustrated, provides a means for mounting the various components of suspension 12. Lower control arm 15 is mounted on the vehicle frame 14 at pivot point 16. Near the outboard end 17 of lower control arm 15 is stud 21 which extends from ball joint 22. Stud 21 provides a lower mount for a steering knuckle (not illustrated) to which a hub (not illustrated) and the vehicle wheel (not illustrated) are mounted. As the vehicle wheel encounters variations in the surface upon which it is traveling, the suspension cycles due to road inputs and lower control arm 15 rotates about pivot point 16.

Shock absorber 30 is mounted between the lower control arm 15 and vehicle frame 14. Positioned about shock absorber 30 is coil spring 40. Coil spring 40 extends between lower control arm 15 and vehicle frame 14. Rotation of lower control arm 15 results in arcuate travel of shock absorber pivot mounting point 28 and spring seat 19. As lower control arm 15 rotates about pivot point 16, coil spring 40 experiences a resultant expansion or compression.

Positioned between the bottom end coil 41 of coil spring 40 and spring seat 19 of lower control arm 15 is lower spring insulator 10. Positioned between the top end coil 42 of coil spring 40 and spring seat 23 of the vehicle frame 14 is upper spring insulator 11. Upper spring insulator 11 is identical to lower spring insulator 10. Insulators 10 and 11 operate to buffer the reaction between coil spring 40 and both the lower control arm 15 and the vehicle frame 14 during suspension cycling.

Figure 2:
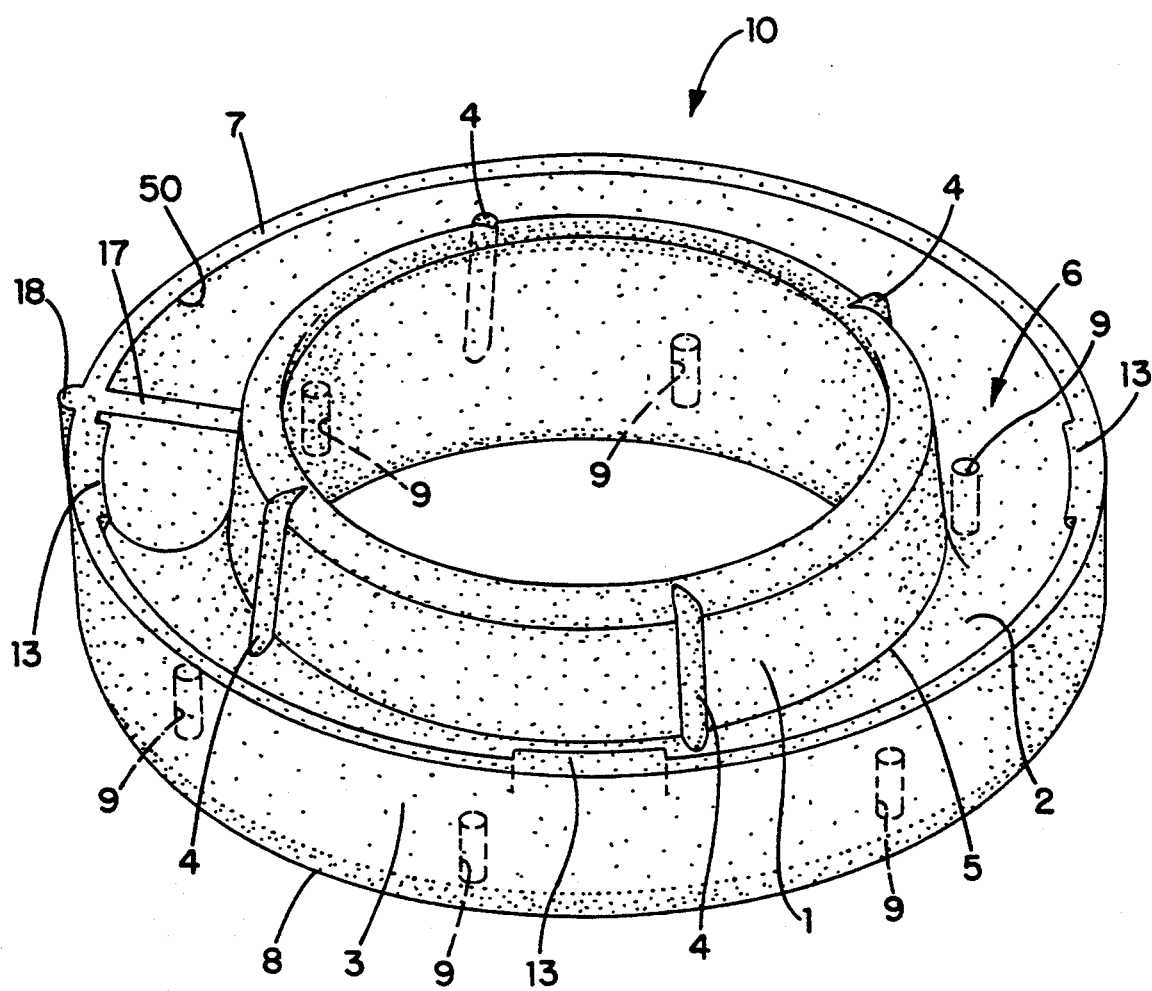
FIG. 2 is a perspective view of an insulator for a vehicle suspension according to the present invention.

Referring additionally to FIG. 2, the spring insulator 10 is illustrated in greater detail. Insulator 10 is formed of a resilient material preferably an elastomer such as polyisoprene and is positioned between the metal coil spring 40 and the metal vehicle components consisting of lower control arm 15 and vehicle frame 14. Insulator 10 includes an elastic annular seat portion 6 having a seat 2 for engaging coil spring 40. Seat 2 is adapted to mate with the end coil 41 of coil spring 40. On the opposite side of annular seat portion 6 from seat 2 is base 8. Base 8 is adapted for positioning on the lower control arm 15 in the receptive annular channel formed by spring seat 19 and in the receptive annular channel formed by spring seat 23 of frame 14.

Extending from the inner diameter 5 of annular seat portion 6 is a tapered inner annular sleeve 1. Molded in the radially outer surface of inner annular sleeve 1 are ribs 4. Four ribs 4 are positioned such that they exert a radially outwardly directed force normal to the axis 24 such that an interference results between insulator 10 and coil spring 40 when inner annular sleeve 1 is inserted into spring 40. The interference provides a means of retaining the insulator 10 on the end coil 41 of coil spring 40.

Extending from the outer periphery of the annular seat portion 6 of insulator 10 is annular flange 3. Annular flange 3 terminates at outer lip 7. Positioned around the inside diameter 50 of outer lip 7 are three tabs 13. Tabs 13, in combination with ribs 4, provide preassembly retention of insulator 10 on coil spring 40. Therefore, a subassembly comprising coil spring 40, lower spring insulator 10 and upper spring insulator 11 is made which does not become disassembled during normal handling processes.

The inside diameter 50 of outer lip 7 is larger than the normal outside diameter of coil spring 40. This feature is adapted to the assembly of the suspension 12 wherein coil spring 40 is compressed when assembled between frame 14 and control arm 15 which results in a radially outward expansion of the coils of coil spring 40. Therefore, outer lip 7 will not be in full contact with the coil spring 40 during complete cycle's of suspension travel as the outward radial expansion is reversed when coil spring 40 expands axially.

Extending through annular seat portion 6 from seat 2 to base 8 are six evenly spaced holes 9. Holes 9 permit fluid to drain through the insulator away from coil spring 40 to reduce the corrosiveness of the environment. Therefore, the annular channel formed through the combination of seat 2, inner annular sleeve 1 and annular flange 3 of insulator 10 does not operate as a fluid trap when positioned on the lower end of coil spring 40.

Positioned across seat 2 in the annular channel formed by the combination of seat 2, inner annular sleeve 1 and annular flange 3, between annular flange 3 and inner annular sleeve 1 is stop-locator 17. Stop-locator 17 operates to radially position insulator 10 on coil spring 40. Stop-locator 17 is molded to extend outside the outer diameter of annular flange 3 providing tang 18.

The extension of stop-locator 17 outside the outer diameter of annular flange 3 into tang 18 provides a coil end indicator for radial location of insulator 10 so that the end of the coil spring 40 is positively located when assembled in the vehicle suspension 12. Accurate radial location of the end of coil spring 40 provides consistent vehicle suspension and alignment settings when coil spring 40 is assembled between the lower control arm 15 and the vehicle frame 14.

What is claimed is:

1. An insulator for positioning between a coil spring's end coil and mating vehicle suspension structure comprising:
   an annular seat portion having a seat adapted to receive the spring's end coil;
   an inner annular sleeve extending from the annular seat portion;
   an annular flange extending from the annular seat portion, in combination, the seat, the inner annular sleeve and the annular flange forming an annular channel adapted to receive the coil spring's end coil; and
   a locator stop positioned across the annular channel and extending radially outward from the annular flange providing a radial spring location indicator tang.

2. An insulator for positioning between a coil spring's end coil and mating vehicle suspension structure comprising:
   an annular seat portion having a seat adapted to receive the spring's end coil;
   an inner annular sleeve extending from the annular seat portion having a radially outer surface with a plurality of longitudinal ribs thereon;
   an annular flange extending from the annular seat portion, in combination, the seat, the inner annular sleeve and the annular flange forming an annular channel adapted to receive the coil spring's end coil; and
   a locator stop positioned across the annular channel and extending radially outward from the annular flange providing a radial spring location indicator tang.

3. An insulator for positioning between a coil spring's end coil and mating vehicle suspension structure comprising:
   an annular seat portion having a seat adapted to receive the spring's end coil;
   an inner annular sleeve extending from the annular seat portion having a radially outer surface with a plurality of longitudinal ribs thereon;
   an annular flange extending from the outer periphery of the annular seat portion terminating at an outer lip which has a plurality of tabs extending radially inwardly therefrom, in combination, the seat, the inner annular sleeve and the annular flange forming an annular channel adapted to receive the coil spring's end coil; and
   a locator stop positioned across the annular channel and extending radially outward from the annular flange providing a radial spring location indicator tang.

4. An insulator for positioning between a coil spring's end coil and mating vehicle suspension structure comprising:
   an annular seat portion having a plurality of holes therethrough and a seat adapted to receive the spring's end coil;
   an inner annular sleeve extending from the seat having a radially outer surface with a plurality of longitudinal ribs thereon;
   an annular flange extending from the annular seat portion terminating at an outer lip which has a plurality of tabs extending radially inwardly therefrom, in combination, the seat, the inner annular sleeve and the annular flange forming an annular channel adapted to receive the coil spring's end coil; and
   a locator stop positioned across the annular channel and extending radially outward from the annular flange providing a radial spring location indicator tang.

5. An insulator for positioning on each of both ends of a coil spring of a vehicle's suspension in contact with mating surfaces of a vehicle's spring seats comprising:
   an elastic annular seat portion having a plurality of holes therethrough and a seat adapted to receive the spring's end coil;
   a tapered inner annular sleeve extending from the annular seat portion having a radially outer surface with a plurality of longitudinal ribs thereon;
   an annular flange extending from the annular seat portion terminating at an outer lip which has a plurality of tabs extending radially inwardly therefrom, in combination, the seat, the inner annular sleeve and the annular flange forming an annular channel adapted to receive the coil spring's end coil; and
   a stop-locator positioned across the channel and extending radially outward from the annular flange providing a tang for indicating the coil spring's radial orientation to accurately position an end of the coil spring toward an outboard side of the suspension.

* * * * *